United States Patent [19]
Warnecke

[11] Patent Number: 5,743,379
[45] Date of Patent: Apr. 28, 1998

[54] CONVEYOR BELT FEED/DISCHARGE INSERT

[75] Inventor: Karl Warnecke, Sibbesse, Germany

[73] Assignee: Transnorm System GmbH, Harsum, Germany

[21] Appl. No.: 754,892

[22] Filed: Nov. 22, 1996

Related U.S. Application Data

[63] Continuation-in-part of Ser. No. 423,883, Apr. 18, 1995, abandoned.

[30] Foreign Application Priority Data

Apr. 19, 1994 [DE] Germany .................. 44 13 137.2

[51] Int. Cl.⁶ .................................................. B65G 15/62
[52] U.S. Cl. ..................................... 198/839; 198/841
[58] Field of Search ................................ 198/839, 841, 198/831

[56] References Cited

U.S. PATENT DOCUMENTS

| | | | |
|---|---|---|---|
| 2,128,594 | 8/1938 | Rasmussen | 198/839 X |
| 2,128,595 | 8/1938 | Rasmussen | 198/839 X |
| 2,222,019 | 11/1940 | Buchanan | 198/839 |
| 2,912,722 | 11/1959 | Howell | 198/841 X |
| 3,189,166 | 6/1965 | Ziller | 198/839 X |
| 4,518,303 | 5/1985 | Moser | 198/841 X |
| 4,633,996 | 1/1987 | Waterhouse | 198/839 X |
| 5,083,657 | 1/1992 | Kelsey | 198/839 X |

FOREIGN PATENT DOCUMENTS

| | | | |
|---|---|---|---|
| 73 42362 | 6/1975 | France | 198/839 |
| 2032980 | 1/1972 | Germany | 198/839 |
| 2321535 | 11/1973 | Germany . | |
| 2-193803 | 7/1990 | Japan | 198/839 |
| 433756 | 8/1935 | United Kingdom | 198/839 |
| 2 189 758 | 11/1987 | United Kingdom | 198/839 |

*Primary Examiner*—Frank E. Werner
*Attorney, Agent, or Firm*—Collard & Roe, P.C.

[57] ABSTRACT

A feed/discharge insert for transporting goods at an acute angle with respect to a main conveyor belt. The insert includes an endless loop conveyor belt having an upper segment and a lower segment. Two rigid deflection bars are positioned one above the other parallel to the main conveyor belt. The two bars are solid with a polygonal, or preferably hexagonal, cross-sections. The upper and lower segments are guided and deflected about the two rigid bars. The endless loop conveyor belt is looped around a cylindrical drive drum of a belt drive. The endless loop conveyor belt contacts the drive drum about at least 180° of its circumference. An adjustable deflection roller is used to vary the degree of contact between the endless loop conveyor belt and the drive drum. The invention also comprises a central station for limiting the lateral run-off of the conveyor belt.

10 Claims, 4 Drawing Sheets

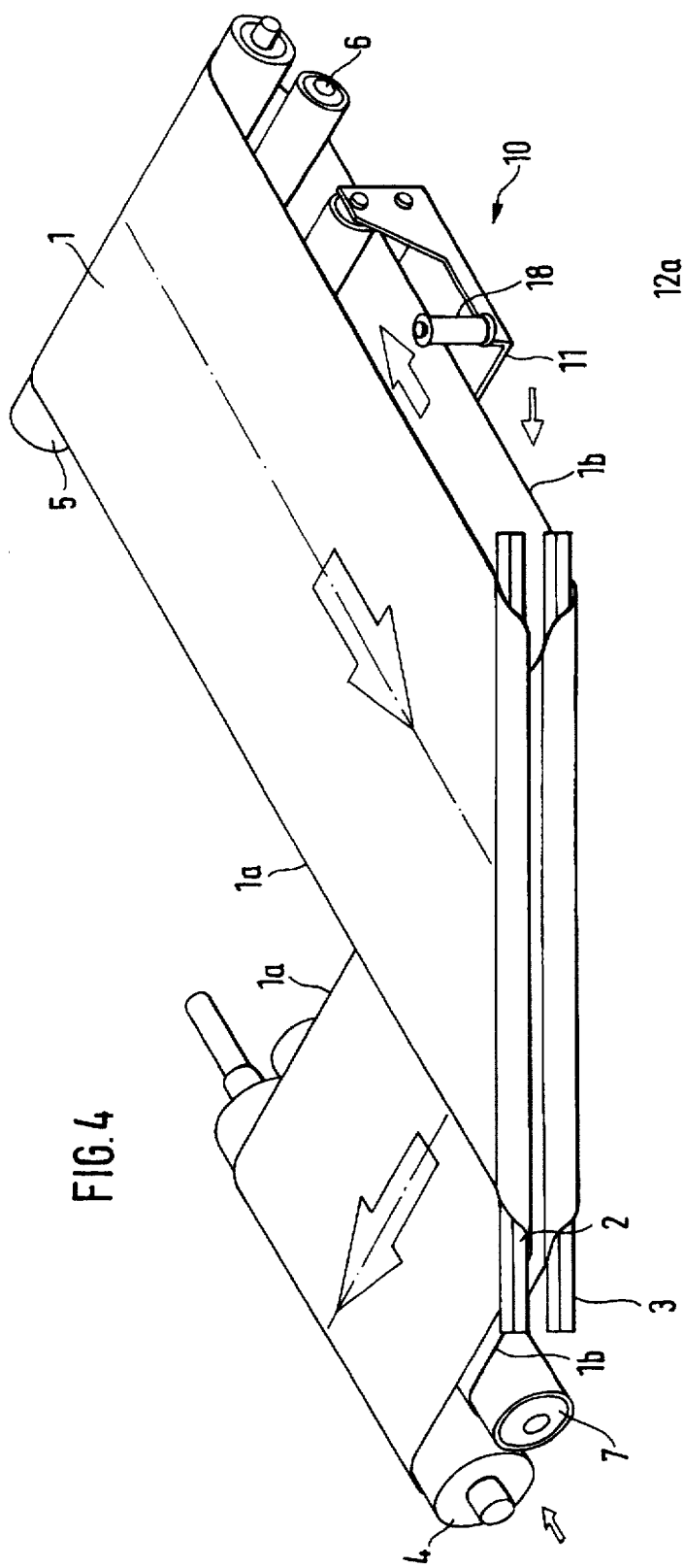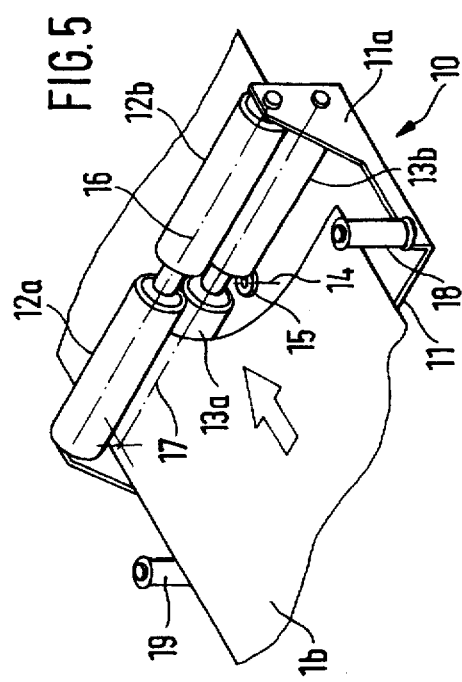

CONVEYOR BELT FEED/DISCHARGE INSERT

This is a continuation-in-part of U.S. patent application Ser. No. 08/423,883, Apr. 18, 1995 now abandoned.

BACKGROUND OF THE INVENTION

1. Field of the Invention

The present invention relates to a device for feeding and discharging goods at an acute angle from the operating section of a conveyor belt. More particularly, it relates to a feed/discharge insert having an endless belt which is guided and deflected by rigid deflection bars and that keeps an even tension throughout operation. The invention also relates to a central station that prevents lateral run-off of the conveyor belt.

2. Prior Art

Various feed and discharge devices or inserts are known for feeding goods onto, and discharging goods from, operating sections of conveyor belts. These feed/discharge inserts include an endless belt which transports material onto, or receives material from, the operating section of the main conveyor belt at an acute angle. The deflection bars are arranged parallel to the main conveyor belt. The conveyor belt of the insert is drawn around these bars. Consequently, the deflection radius can be kept very small and the transfer of the goods onto the main conveyor belt can take place in a virtually seamless manner.

Since the endless belt of the feed/discharge insert comprises an upper segment and a lower segment, the deflection bars are positioned one above the other in pairs. The drive is designed as a head drive, with a separate deflection roller to support the belt on the opposite side of the deflection bars. By virtue of the belt tensioning, high frictional forces are imposed on the deflection bars. These frictional forces, particularly in the case of relatively high speeds, result in a large degree of heat buildup, so that the belt speed and the width of the belt insert are limited. Up until now, single belt inserts have been produced with a nominal width of up to 800 mm.

In order to remedy this, multiple belt inserts comprising narrow belts arranged parallel to each other have been developed. The deflection of the individual, parallel bands at the point of transfer to the main conveyor belt takes place by head deflections. The disadvantages of this system include high technical outlays and triangular gaps between the ends of the individual belts and the main belt edge. These gaps increase as the feeding angle between the feed/discharge insert and main conveyor belt becomes more acute.

In tensioned conveyor belts that tend to run off sideways, it is known to use a control roller to counteract this lateral run-off. The control roller acts only on the surface of the lower segment of the conveyor belt, which supports the conveyed material after the belt has been reversed into the upper segment. The control roller may swing by a few degrees in the plans of the belt. Known control rollers normally have sensor rods rigidly connected and spaced in front of the control roller in the running direction of the belt. The sensor rods are present on both sides of the belt. When an edge of the belt runs against the sensor rod associated with it, the control roller is swiveled accordingly by the run-up pressure. The rolling motion of the control roller inclined relative to the running direction of the belt creates reactive forces. These forces have a component directed transversely to the running direction of the belt, and reset the belt in the proper position.

Control rollers operated by a foreign force are also known. These rollers can be adjusted, i.e., swiveled via contactless scanning devices such as light barriers or capacitive sensors, with the help of pneumatic devices or by means of electric motors.

However, the known designs are not suitable for conveyor belts having almost no tension, such as in connection with a device for channeling in and channeling out goods at an acute angle with respect to a main conveyor belt. The low tension is necessary to limit the heat buildup resulting from frictional forces. However, loose belts with such low tension can transit only very low control roller forces, which do not suffice for resetting a belt running off sideways. Furthermore, adequate transverse stiffness is missing, which prevents transmission of the laterally directed resetting forces. Therefore, the known control roller devices are not useful for highly flexible tensionless belts. The known control roller devices are limited to stiff and tensioned belts for conveyor belt systems, such as those used for transporting bulk materials.

SUMMARY OF THE INVENTION

It is therefore an object of the present invention to overcome the drawbacks of the prior art and to provide a feed/discharge insert which is capable of receiving conveyed goods at relatively high speeds.

It is another object of the invention to create a control device or control station for feeding and discharging goods at an acute angle from the operating section of a conveyor belt, that is capable of limiting lateral run-off in non-tensioned or only slightly tensioned and highly flexible belts.

These and other related objects are achieved according to the invention by a device for transporting goods at an acute angle with respect to a main conveyor belt. The device includes an endless loop conveyor belt having an upper segment and a lower segment. Two rigid deflection bars having polygonal cross sections guide and deflect the upper and lower segments. A belt drive having a cylindrical drive drum moves the belt which contacts the drive drum about at least 180 of the drum's circumference.

The polygonal configuration reduces the frictional heat since there is only linear contact between the belt and bars. At the same time, the air cushions between the edges have a ventilating and friction-reducing lubricating effect. This lubricating effect is effective, however, only when there is low belt tensioning, which ensures sufficient traction only when there is a very large angle of contact of the belt on the drive roller (more than 180°).

The bars are solid, which provides good heat dissipation of the unavoidable frictional heat. The bars have hexagonal cross-sections.

In order to achieve the desired high angle of belt contact with the drive drum, the belt is guided over a deflection roller or "back-up roller", positioned adjacent to the drive drum. The deflection roller presses the belt, with the desired angle of contact, onto the surface of the drive drum without tensioning. This means that the normal force necessary for belt traction is produced only at the contact point, i.e., along the line where the drive drum meets the deflection roller. When the drive drum begins to rotate, the entire surface enclosed by the belt, is provided with the static friction necessary for belt traction, with very low belt tensioning. The negligible belt tensioning results in considerably reduced generation of heat and permits a lower drive output than in the case of conventionally designed feed/discharge inserts. The position of the deflection roller is adjustable to vary the degree of contact between the belt and the drive drum.

The configuration according to the invention permits the feeding and discharging of conveyed goods at a more acute angle than in the case of previously known single belt inserts. The angles can be reduced below 45° to approximately 25°. The speed component directed in the main conveying direction becomes greater, with the result that higher feeding speeds can be achieved. More favorable transfer takes place using only one belt instead of the conventional divided insert belts.

The drive drum consists of a steel cylinder with an elastomeric material vulcanized thereon. When combined with a suitable conveyor belt surface, speeds of up to 3 m/sec are achievable and nominal belt widths of up to 1500 mm are possible. All these features taken together permit optimum transfer with increased feeding and/or discharging speeds.

A preferred embodiment of the invention includes a control station utilizing a pair of control rollers that are rotatably supported in the control station.

The lower segment of the belt is guided between a pair of control rollers, which are rotatably supported in the control station. The control station is swingable with the control rollers around a rotary axle extending perpendicular to the plane of the belt. The control rollers are supported in a console of the control station. The console is rotatably mounted on a threaded trunnion, which forms the rotary axle of the control station and is in the running direction of the lower segment. Sensor rollers are mounted on the console upstream of the control rollers in the running direction of the lower segment and are located on both sides of the lower segment of the belt.

With very wide belts, it is possible to design the control rollers made from several parts, to facilitate the swinging capability with greater belt widths or higher contact pressures. This substantially reduces the erasing effect.

The contact of the belt edges with the control rollers generates low rolling friction and protects the edges of the belt. This is advantageous especially when flexible belts are used.

The control station with the control rollers described above is suitable for automatically controlling, i.e., without the application of foreign force, thin flexible belts in the non-tensioned condition. In this way, the belts are prevented from laterally running off from their driving, supporting and reversing rollers.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and riot as a definition of the limits of the invention.

In the drawings, wherein similar reference characters denote similar elements throughout the several views:

FIG. 4 shows a schematic perspective view of another embodiment of the invention with a control station;

FIG. 5 shows a schematic perspective view of the design of the control station of FIG. 4 with control rollers;

DETAILED DESCRIPTION OF THE PREFERRED EMBODIMENT

Figure 1:
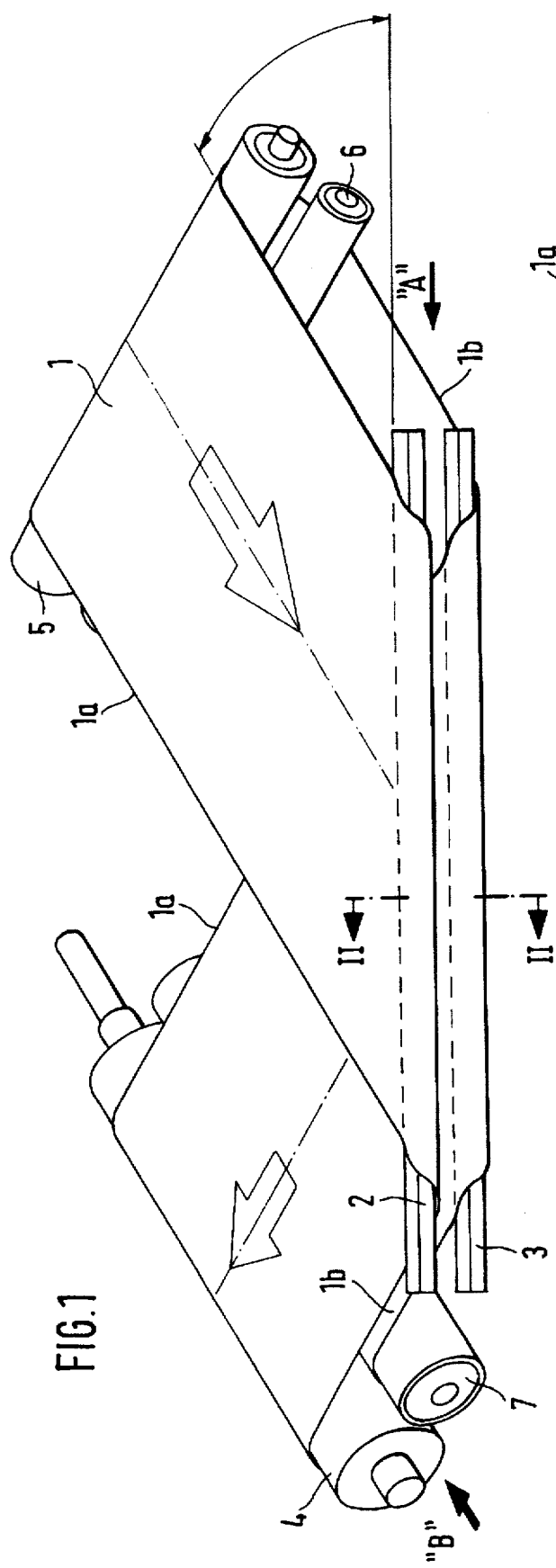
FIG. 1 is a perspective view of a feed/discharge insert according to the invention.
Figure 2:
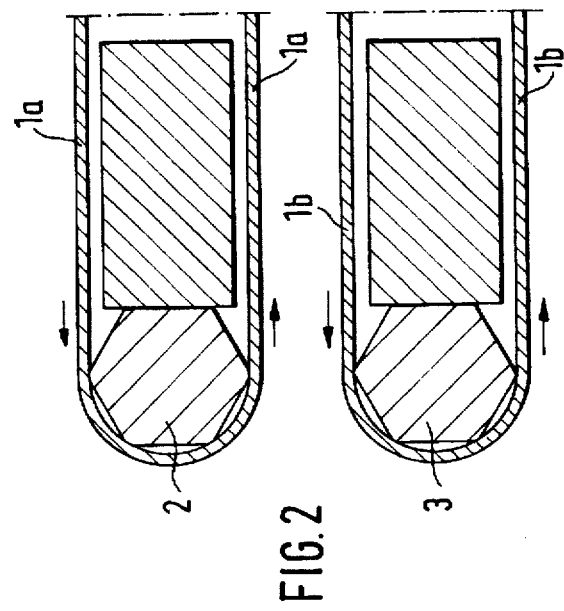
FIG. 2 is a cross-sectional view through the deflection bars taken along the line II—II from FIG. 1.
Figure 3:
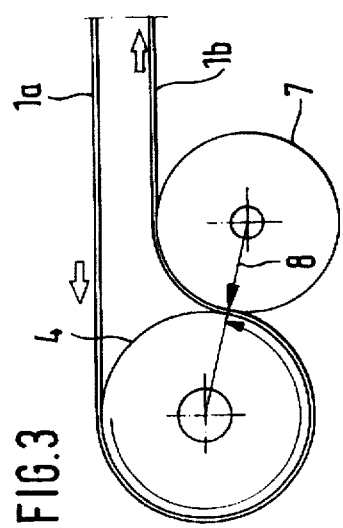
FIG. 3 is a left side-elevational view, of the drive drum and the adjacent deflection roller.

Referring now in detail to the drawings and, in particular FIG. 1, there is a shown a toed/discharge insert with an endless belt 1 having an upper segment or segment 1a and a lower segment or segment 1b. Upper segment 1a is deflected around a hexagonal bar or hexagonal blade 2 in the direction of a drive drum 4. Lower segment 1b, coming from drive drum 4, is deflected around a further hexagonal bar or hexagonal blade 3, in the direction of a head roller 5, which serves only for deflection purposes. A tensioning roller 6 is assigned to head roller 5.

Located adjacent to the drive drum 4 is a deflection roller 7, which is also designated as "back-up roller". It serves to guide the lower segment 1b, without belt tensioning, such that the angle of contact of the belt on drive drum 4 is much more than 180°. When drive drum 4 begins to rotate, a high degree of traction can develop without applying belt tensioning, which would result in an undesired increase in friction between the segments and the deflection bars 2 and 3. The radial pressure of deflection roller 7 is indicated by the vector 8. Said force results in the friction which it restricted, first of all, to the line of contact between drum 4 and roller 7 and by means of which the belt traction is initiated.

An shown in FIGS. 4 and 5 control station 10 substantially consists of a console 11 having roller pairs 12a, 12b, 13a and 13b mounted therein. Lower segment 1b of the belt passes through between the roller pairs.

Console 11 of control station 10 is swingable around rotary axis 14 of rotary trunnion 15. Viewed in the running direction of lower segment 1b, the rotary axis is disposed downstream of rotary axles 16 and 17 of the roller pairs.

In the front part of the console, which is disposed upstream of the rotary axles of the control rollers in the running direction of lower segment 1b, sensor rollers 18 and 19 are mounted on both sides of the segment of the belt. The edges of the belt are capable of running against the sensor rollers. The rollers are rotatable and, therefore, reduce wear due to low rolling friction.

Figure 6:
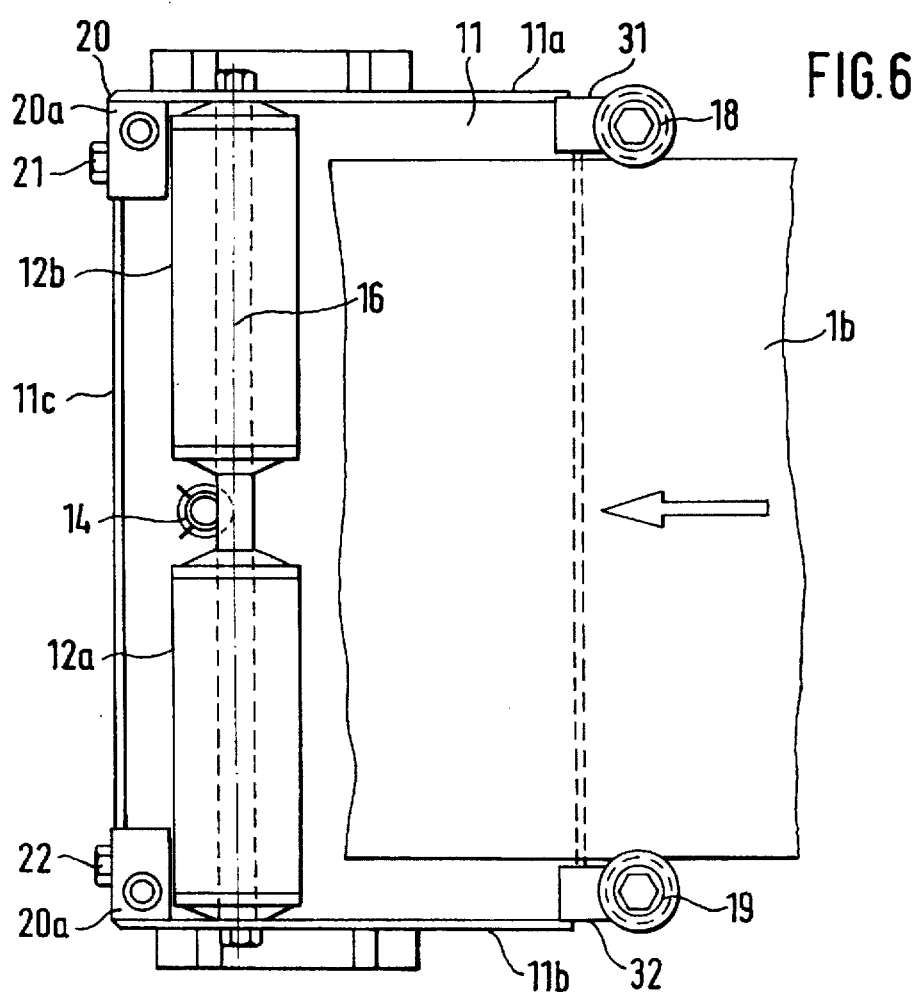
FIG. 6 shows the top view of the control station of FIG. 4.

As shown in FIG. 6, console 11 is designed with two lateral upwardly pointing edges 11a and 11b, and with a face side upwardly pointing edge 11c. In the part of the console disposed upstream of the control rollers in the running direction of belt segment 1b, the console is provided with a downwardly-pointing edge 11d.

Lower control rollers 13a and 13b are directly mounted on lateral, upwardly pointing edged 11a and 11b, as shown in FIG. 5. Upper roller pair 12a and 12b is supported by a roller holder 20, which is mounted on the face side, upwardly pointing edge 11c by screws 21 and 22, as shown in FIG. 6. The roller holder for the upper roller pair supports an inwardly bent flap 20a and a rivet nut 23, which is engaged by a vertical adjustment screw 24, shown in FIG. 8. Vertical adjustment screw 24 enables adjustment of roller holder 20 for upper roller pair 12a and 12b.

Figure 9:
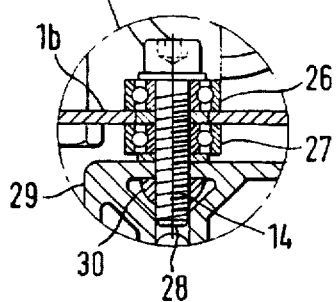
FIG. 9 shows a detail of FIG. 8.

As shown in FIG. 9, console 11 is clamped between ball rings 26 and 27 and is connected with a supporting profile 29 via a rotary trunnion in the form of a cylindrical screw 28. For fastening, cylindrical screw 28 engages a groove keys 0, which has an inside thread and is inserted in a groove of the supporting profile. The console and, therefore, the entire control station is rotatable around axle 14 via ball rings 26 and 27.

Sensor rollers 18 and 19 are mounted on front, downwardly-pointing edge lid axle holders 31 and 32, as shown in FIG. 6.

Figure 7:
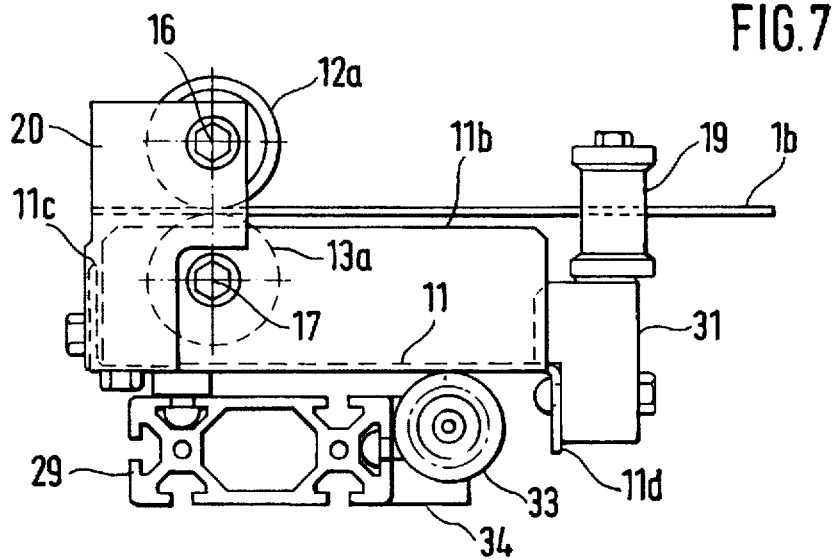
FIG. 7 shows a lateral view of the control station according to FIG. 6.
Figure 8:
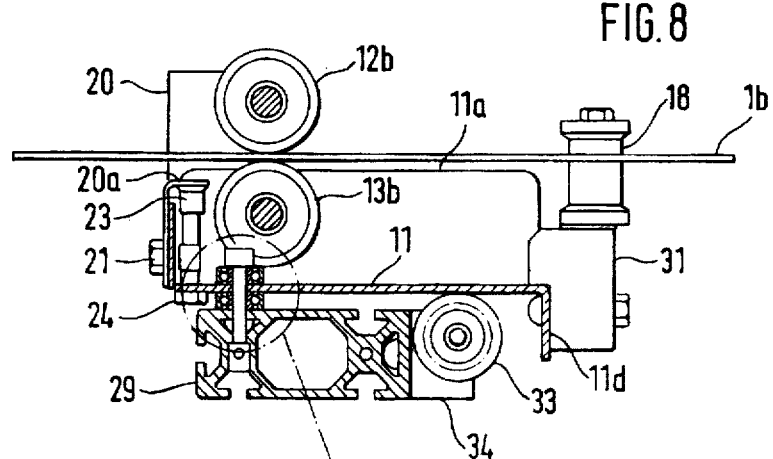
FIG. 8 shows a longitudinal section along the belt center line through the control station according to FIG. 6.

For reducing the stress of cylindrical screw 28, support roller 33 supports the front part of console 11, as shown in FIGS. 7 and 8. Support roller 33 is mounted on supporting profile 29 via an axle holder 34.

Figure 10A:
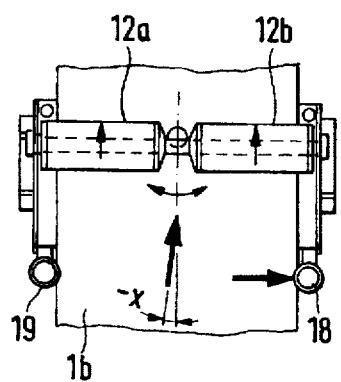
FIGS. 10a to 10c show different positions of the control rollers during operation of the belt.
Figure 10B:
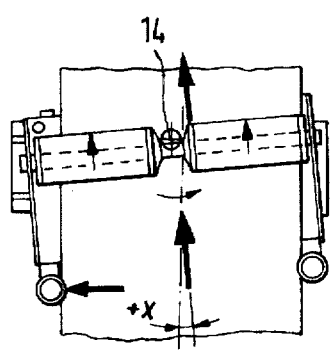
Figure 10C:
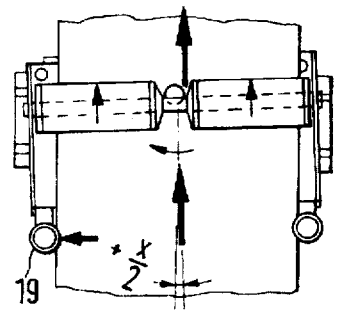

FIG. 10a shows that the belt has, in the plane of projection, a tendency to run off to the right. The right edge of the belt applies a pressure to right sensor roller 18. This causes the sensor roller to yield to the right, and causes a counterclockwise swivel motion, as shown in FIG. 10b. With the swivel motion, the control rollers produce reactive forces directed to the left. This causes the belt to be oriented again to the left until left sensor roller 19 comes into contact with the left belt edge and slightly yields to the left due to the resetting force. The entire control station thereby swings back in the clockwise direction shown in FIG. 10c. This reduces the resetting effect of the control rollers. However, the run of the belt continues to be aligned to the left. As soon as all forces are in equilibrium, the self-adjustment process is completed.

While only a few embodiments of the present invention have been shown and described, it is to be understood that many changes and modifications may be made thereunto without departing from the spirit and scope of the invention as defined in the appended claims.

What is claimed is:

1. A device for transporting goods at an acute angle with respect to a main conveyor belt, the device comprising:

an endless loop conveyor belt having an upper segment and a lower segment;

two rigid deflection bars having polygonal cross-sections with alternating planar surfaces and vertices for guiding and deflecting said upper and lower segments, a belt drive comprising a cylindrical drive drum with a circumference, said endless loop conveyor belt contacting said drive drum about at least 180° of the circumference to increase traction to drive said belt under low tension;

wherein said conveyor belt makes linear contact with the vertices with air cushions formed between said planar surfaces and said low tension belt so that ventilation is provided between then vertices to reduce friction.

2. The device according to claim 1, wherein said two rigid deflection bars are solid bars.

3. The device according to claim 2, wherein said two rigid deflection bars have hexagonal cross-sections.

4. The device according to claim 1, wherein said belt drive comprises a deflection roller positioned adjacent said drive drum, said deflection roller directing said endless loop conveyor belt against said drive drum.

5. The device according to claim 4, wherein the position of said deflection roller is adjustable to vary the degree of contact between said endless loop conveyor belt and said drive drum.

6. A device according to claim 1, further comprising a control station for limiting lateral movement of the conveyor belts said control station comprising:

a console;

a pair of control rollers rotatably supported in the console and which rotate about their longitudinal axes;

a threaded trunnion extending perpendicular to the plane of the conveyor belt, said trunnion forming a rotary axle on which the console is mounted, said trunnion being arranged downstream of the control rollers in the running direction of the lower segment of the conveyor belt, wherein the control station swings around the rotary axle;

a plurality of sensor rollers rotatably mounted on the console, said rollers arranged upstream of the control rollers in the running direction of the lower segment of the conveyor belt and arranged on both sides of the lower segment.

7. A device according to claim 6, wherein the control rollers are divided into a plurality of sections.

8. A device according to claim 6, further comprising a plurality of ball rings rotatably supporting the console, wherein said trunnion extends through said ball rings.

9. A device according to claim 6, wherein the console is comprised of an integral metal sheet having sections that have upwardly and downwardly-pointing edges, wherein the control and sensor rollers are mounted on said sections.

10. The device according to claim 6, wherein the threaded trunnion comprises a cylindrical screw, and further comprising a groove key and a supporting profile, wherein the cylindrical screw is mounted on the supporting profile via the groove key.

* * * * *